(12) United States Patent
Marom

(10) Patent No.: US 6,867,920 B2
(45) Date of Patent: Mar. 15, 2005

(54) OPTICAL BEAM-STEERING SWITCHING SYSTEM HAVING BEAM COUPLING CONTROL

(75) Inventor: Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/621,556

(22) Filed: Jul. 17, 2003

(65) Prior Publication Data

US 2005/0013003 A1 Jan. 20, 2005

(51) Int. Cl.$^7$ .......................... G02B 27/10; G02B 6/26; G02B 6/00
(52) U.S. Cl. .......................... 359/619; 385/39; 385/140
(58) Field of Search ................................ 359/298, 619; 385/16, 27, 39, 140

(56) References Cited

U.S. PATENT DOCUMENTS 6,657,770 B2 * 12/2003 Marom et al. .............. 359/290
6,697,547 B2 * 2/2004 Walter et al. ................. 385/16

* cited by examiner

Primary Examiner—David N. Spector

(57) ABSTRACT

Apparatus controls optical coupling attenuation of an input optical beam to one of a plurality of output optical facilities. The apparatus includes a plurality of lenses, each lens aligned to couple a received optical beam to one of the plurality of output optical facilities and to couple the beam to a corresponding co-axially aligned output facility. Contiguous pairs of the plurality of lenses are arranged to have a predetermined space between such contiguous pairs, so that when the direction of a received beam is misaligned to a destination lens of a contiguous pair, only a first portion of the received beam gets coupled to the corresponding output facility of that destination lens and a second portion of the received beam propagates into the predetermined space so as not to be coupled to any of the plurality of output facilities. This results in an optimally sized optical switch that provides the necessary attenuation functionality while keeping the crosstalk level to other output facilities below the required crosstalk threshold. In another embodiment, the optical coupling control apparatus is implemented as part of an optical beam-steering switching apparatus that also includes an optical beam-steerer for receiving an input optical beam and for changing the direction of the received beam relative to one of the plurality of lenses so as to change the first portion of the received beam propagated to the corresponding output facility.

10 Claims, 8 Drawing Sheets

OPTICAL BEAM-STEERING SWITCHING SYSTEM HAVING BEAM COUPLING CONTROL

TECHNICAL FIELD

The present invention relates to optical communications and, more particularly, to an optical switching system that uses free-space optical beam-steering to the control coupling efficiency of an input optical beam to an output optical facility.

BACKGROUND OF THE INVENTION

The transmission capacity of fiber-optic communication systems has increased significantly with the Wavelength Division Multiplexing (WDM) technique. In a WDM system, multiple channels, where each channel is differentiated by the use of a different wavelength of light, carry modulated optical signals in a single optical fiber. Optical multiplexers are used to combine all the optical channels into the fiber for transmission, and optical demultiplexers are used to separate the optical channels for detection. An additional requirement for optical transmission is that the power level of all the WDM channels be roughly equal, to prevent the corruption of the modulated optical signals on the weaker channels.

In an optical network, network traffic is routed from a plurality of sources to a plurality of destinations via one or more intermediate nodes, each of which may be connected to one or more neighboring nodes. Accordingly, each intermediate node requires some switching or cross connection capability to select an appropriate neighboring node in order to route the traffic towards the desired destination. An intermediate node typically includes opto-electronic conversion and performs wavelength switching or cross connection electronically by (a) terminating one or more wavelength channels at a receiver endpoint, (b) switching wavelength channels through the node, and (c) originating one or more wavelength channels at a transmitter point. Alternatively, the intermediate nodes can operate transparently, routing the individual optical wavelength channels without optoelectronic conversion. Regardless, intermediate nodes are required to switch incoming wavelength channels from an input port to a desired output port, so that a channel originating at an upstream node can pass through the intermediate node en route toward its downstream node destination. When the switching functionality in the intermediate node is performed electronically, the optical transmitters at the output ports can be set to satisfy the power equalization criteria. However, when the switching functionality is operated transparently, the switch has to provide not only the cross-connect feature from input ports to output ports, but must also provide the mechanism to equalize the optical power level at the output ports.

SUMMARY OF THE INVENTION

In accordance with the present invention, there is disclosed apparatus for implementing an optical power equalization feature for use in an optical cross-connect switches based on beam-steering with maximum utilization of the optical system aperture. In one embodiment, the beam-steering apparatus uses Micro Electro Mechanical Systems (MEMS) based micro-mirrors. Power equalization is performed by tilting the MEMS mirrors to induce an intentional misalignment of the beam to control beam-coupling efficiency to the desired output fiber. Special design considerations in the arrangement of the output fiber array prevent the misaligned beam from coupling to an undesired output fiber, thereby preventing undesired crosstalk, while maximizing the number of output fibers that can be arranged with the system aperture.

More generally, apparatus is disclosed for controlling the optical coupling of an input optical beam to one of a plurality of output optical facilities, comprising
  a plurality of lenses, each lens aligned to couple a received optical beam to one of the plurality of output optical facilities,
  a plurality of output optical facilities, each optical facility aligned co-axially with a corresponding one of the plurality of lenses, and wherein
  contiguous pairs of the plurality of lenses are arranged to have a predetermined space between such contiguous pairs, so that when the direction of a received beam is misaligned to a destination lens of a contiguous pair, only a first portion of the received beam gets coupled to the corresponding output facility of that destination lens and a second portion of the received beam propagates into the predetermined space so as not to be coupled to any of the plurality of output optical facilities.

In another embodiment, the optical coupling control apparatus is implemented as part of an optical beam-steering switching apparatus that also includes
  an optical beam-steerer for receiving an input optical beam and for changing the direction of the received beam relative to one of the plurality of lenses so as to change the first portion of the received beam propagated to the corresponding output facility. In a further embodiment, apparatus for controlling the optical coupling of an input optical beam to one of a plurality of output optical facilities, comprises
  an input lens for receiving an input optical beam,
  a plurality of output lenses, each lens aligned to couple a received optical beam to one of the plurality of output optical facilities, each of the received optical beams being produced from the input beam,
  a plurality of output optical facilities, each optical facility aligned co-axially with a corresponding one of the plurality of lenses, and wherein
  the plurality of lenses are arranged in a one-dimensional array, the input lens located between and contiguous to two output lenses to form a three lens group, the remaining lenses of the plurality of lenses being arranged in contiguous pairs, the three lens group and the contiguous pairs of the one-dimensional array being arranged to have a predetermined space between any contiguous pair and another contiguous pair or said three lens group, so that when a received beam is misaligned to a destination lens of a contiguous pair, only a first portion of the received beam gets coupled to the corresponding output facility of that destination lens and a second portion of the received beam propagates into the predetermined space so as not to be coupled to any lens of the plurality of output optical facilities.

It should be noted that optical coupling control apparatus also works in reverse, i.e., it can direct the coupling of one or more input beams to a single output. The placement of the fibers and lenses remains the same due to the reciprocal nature of light propagation.

BRIEF DESCRIPTION OF THE DRAWINGS

The present invention will be more fully appreciated by consideration of the following detailed description, which should be read in light of the following drawings.

DETAILED DESCRIPTION

Free-space optics technology for fabrication of components for optical communication systems is gaining favor due to the advent of Micro Electro Mechanical Systems (MEMS) based micro-mirrors. These MEMS micro-mirrors can typically tilt in one or two orthogonal axis, and are designed to perform beam steering of an incident beam to a desired location or direction. The operations of such a MEMS micro-mirror device is described in the article entitled "Wavelength add-drop switching using tilting micromirrors," by Ford, J. E.; Aksyuk, V. A.; Bishop, D. J.; Walker, J. A.; Lightwave Technology, Journal of, Volume: 17 Issue: 5, May 1999 Page(s): 904–911 which is incorporated by reference herein.

Figure 1:
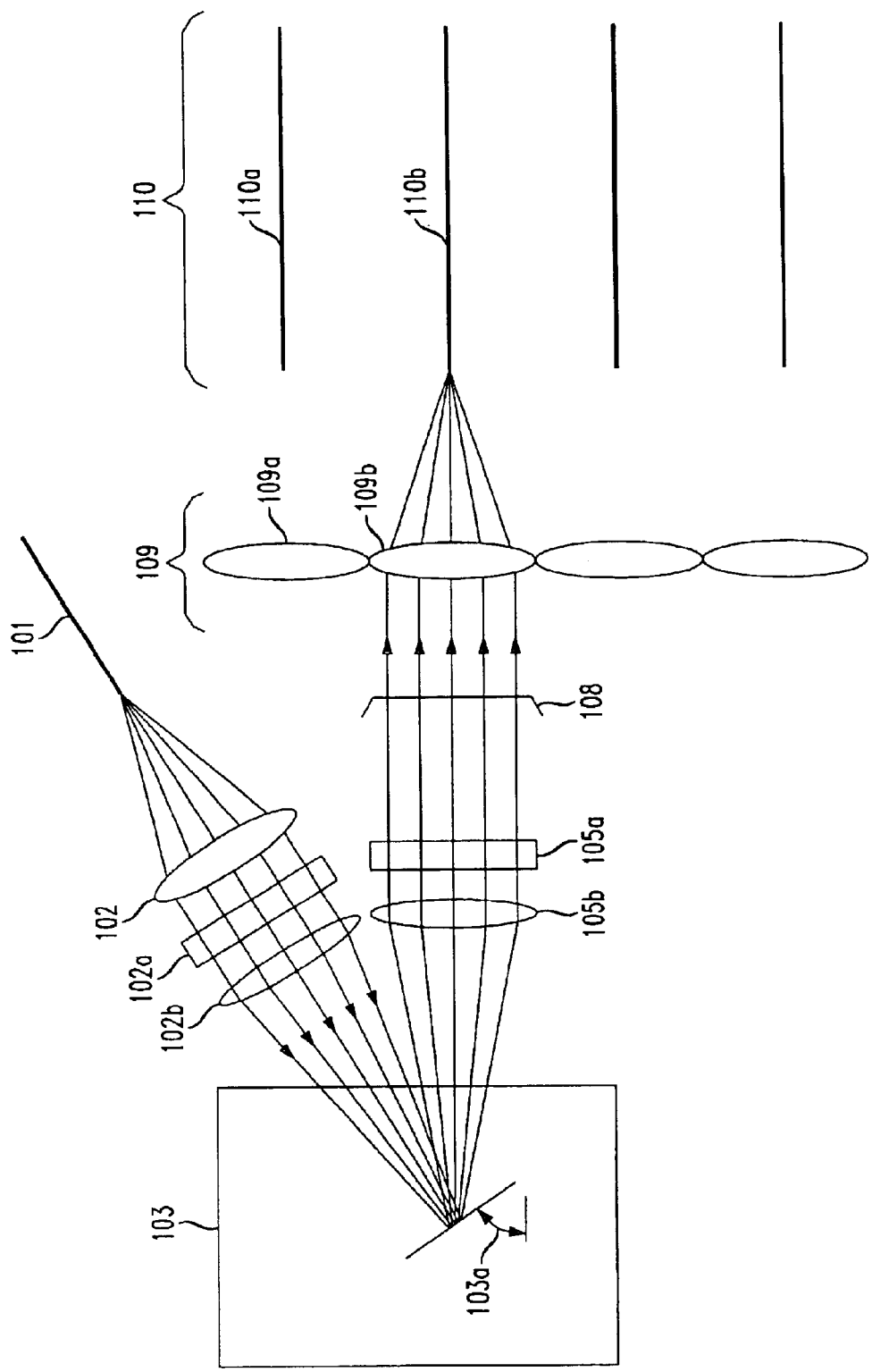
FIG. 1 is a prior art arrangement showing how an input optical beam is steered to one of multiple lenses that each focus onto a different output fiber.

Shown in FIG. 1 is a prior art arrangement showing how an input optical beam is steered to one of multiple lenses that each focus onto a different output fiber. In such an arrangement, the source of the input beam is typically an optical fiber 101 whose radiated beam is collimated by a lens 102. The input beam, which can carry either a single wavelength or a WDM signal, is focused on beam-steerer 103 using lens 102b, where beam steerer uses only one MEMS mirror. The steered beam is collimated by lens 105b, resulting in beam 108 propagating towards micro lens array 109. The beam destination is usually another fiber or one of multiple fibers 110, where each has a separate focusing lens in array 109 to direct the beam to the desired output fiber. As FIG. 1 illustrates, beam 108 is incident on particular lens 109b, which focuses beam onto output fiber 110b. Alternatively, if the input beam is a WDM signal, the optical system can include diffraction gratings (102a and 105a) and beam steerer 103 be a MEMS mirror array, where there is a separate mirror for each constituent WDM wavelength channel. It should be understood that FIG. 1 can be arranged so that focusing lenses 102b and 105b can be the same physical lens and diffraction gratings 102a and 105a can be the same physical grating, where each element is used for both the incident and reflected beams of beam steerer 103.

Figure 2:
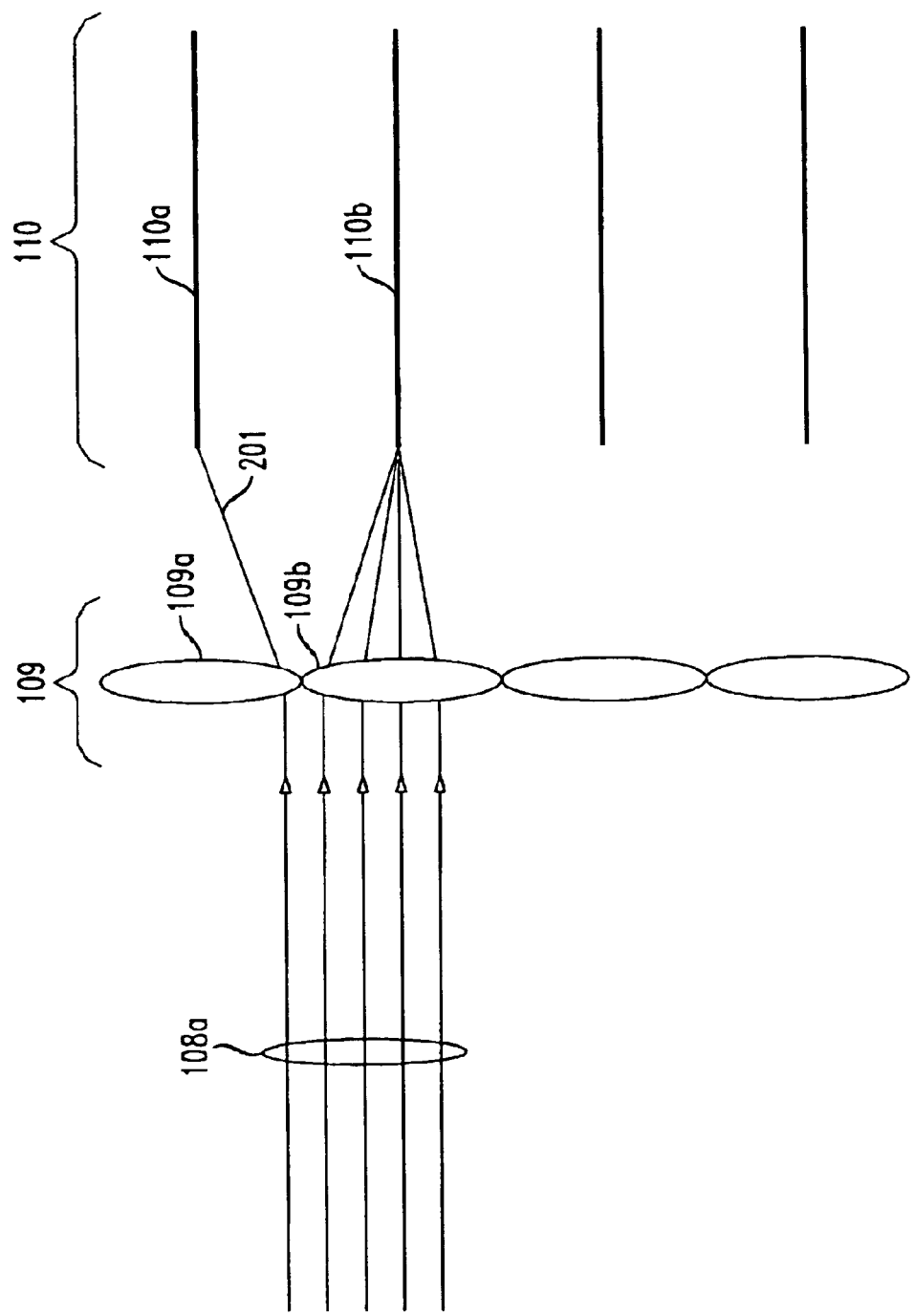
FIG. 2 is an illustration of an optical beam that is slightly misaligned to the focusing lens and which generates crosstalk on an adjacent fiber.

When the component is designed to support the power equalization feature, a controllable loss mechanism has to be added. This can be accomplished via the functionality of the MEMS micro-mirrors 103, whose angle 103a can be continuously controlled, by tilting the beam away from optimal coupling to the desired output fiber and thereby induce loss. As shown in FIG. 2, however, when the beam 108a is shifted from the optimal location 108, undesirable crosstalk 201 to an adjacent output fiber 110a may occur, where some of the energy of beam 108a is directed via lens 109a to the adjacent output fiber 110a or channel.

Figure 3:
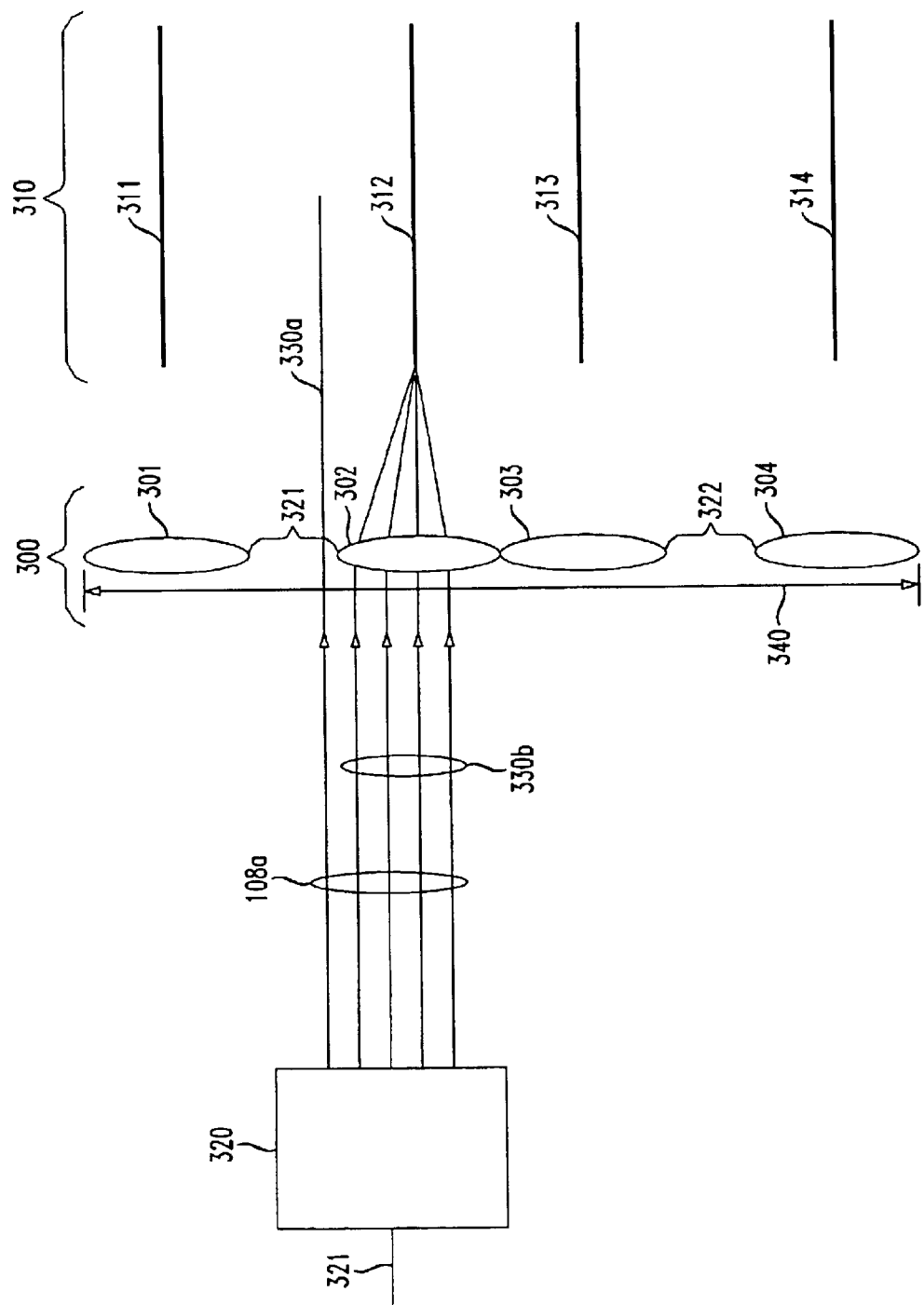
FIG. 3 is an illustration of an embodiment of the present invention that includes a misaligned beam and a gap between the focusing lenses.

Referring now to FIG. 3, there is shown an embodiment of my optical coupling control apparatus for controlling the optical coupling of an input optical beam to one of a plurality of output optical fibers with efficient use of optical system aperture 340 (extent of lens array 300). While optical fibers are the most likely source and destination of the optical beams, other optical facilities, such as free space, integrated optical paths, etc may be utilized. In FIG. 3 my optical coupling control apparatus, which includes lens array 300 and fiber array 310, is shown as being part of an optical beam-steering switching apparatus that also includes beam-steerer unit 320 (consisting of elements 120 of FIG. 1). My optical coupling controlling apparatus may be utilized with a variety of beam-steerer units. Thus the beam-steerer unit 320 need not be restricted to a MEMS micro mirror type arrangement, but may, more generally, be implemented using other types of optical beam reflection or transmission based beam-steering apparatus.

As shown, one or more input ports 320a may be used to couple input beam(s) to beam-steerer unit 320. The respective fibers 311–314 of fiber array 310 are aligned co-axially with corresponding focusing lenses 301–304 of lens array 300. The corresponding fibers and lenses are grouped in contiguous pairs, e.g., 302–303, with spaces or gaps, e.g., 321, inserted between these contiguous pairs. Since the fiber array 310 and the focusing lens array 300 are arranged in a non-uniform fashion, each optical beam, e.g., 108a, will always have an adjacent gap, i.e., 321, into which direction the beam can be tilted away from the desired destination fiber, i.e., 312, without coupling into an adjacent fiber, i.e., 311. When it is desired to attenuate the power level of an optical beam, e.g., 108a, the beam-steerer unit 320 is controlled to change the direction of the beam (in the direction of the gap 321) so that it is misaligned relative to the associated focusing lens 302. The result is that a predetermined portion of the optical energy 330a misses the focusing lens 302 to the desired output fiber 312 and is directed into the gap 321 where it continues to propagate without impinging any of the fibers in array 310. The other portion 330b of the optical beam (attenuated beam) propagates to focusing lens 302 and to the desired output fiber 312. In this manner, the optical beam sent to output fiber 312 can be attenuated with only minimal unwanted crosstalk to adjacent fiber 311, unlike the crosstalk levels produced by FIG. 2.

Figure 4:
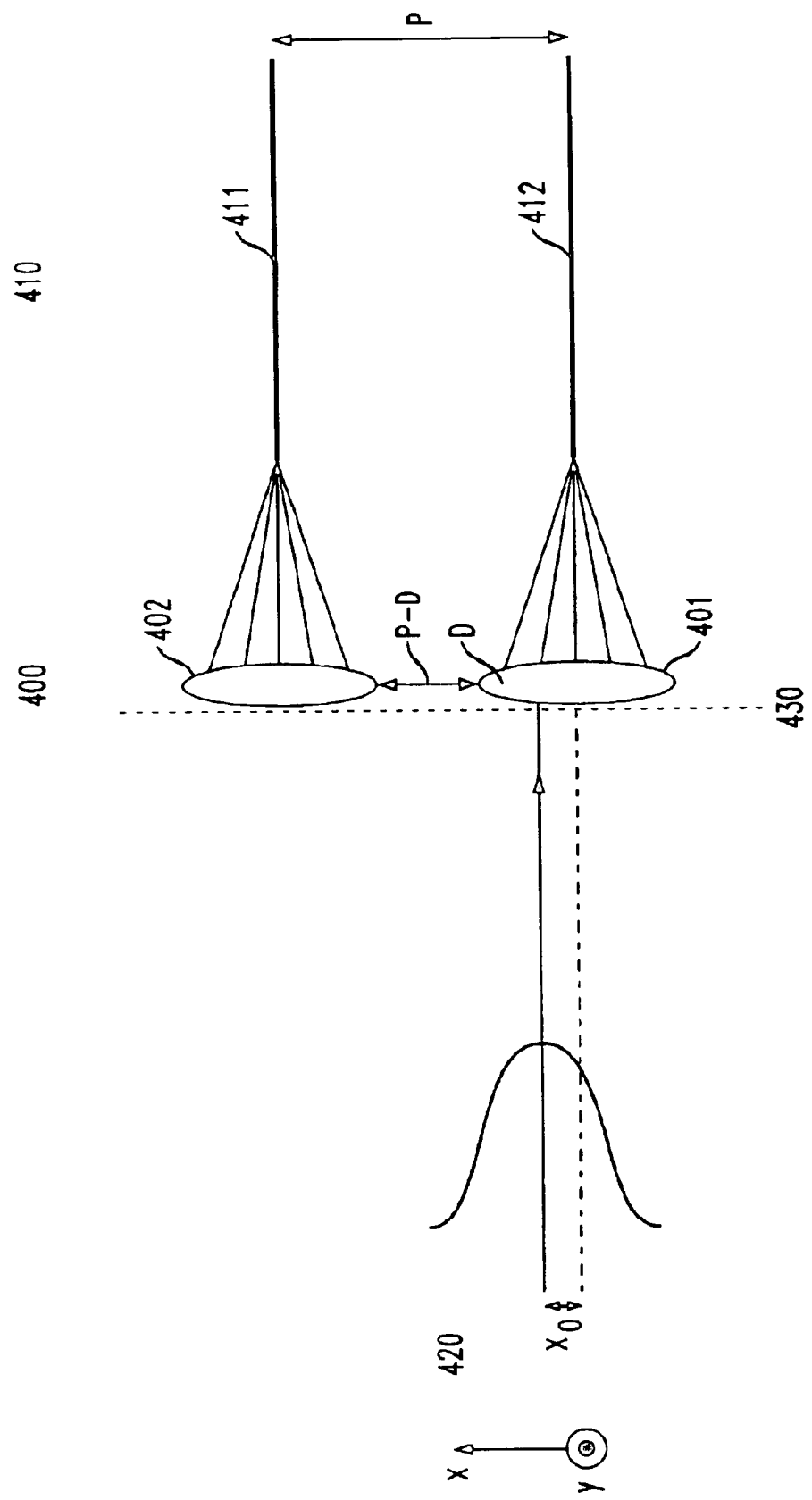
FIG. 4 is an illustration of the defining parameters for calculating the necessary gap size.

Since there is an additional design requirement to minimize the overall size of the microlens array 300 and fiber array 310 (to reduce the tilting range of the MEMS micromirrors), the size of the space (or gap) 321 has to be designed such that the desired beam attenuation range is achieved without excessive crosstalk. With reference to FIG. 4, the gap size 321 can be designed by calculating the coupling efficiency integral over the extent of the microlens aperture. Let each microlens have a diameter D and the two microlenses be separated by pitch P (with the resulting gap size being P-D). Denoting the normalized collimated beam profile (at plane 430) by $\Box(x, y)$ and the incident beam offset by $x_0$, then the attenuated coupling efficiency and the crosstalk coupling efficiency are defined by $$\eta_{attenuation} = \left| \int_{lens\,area} \Psi(x, y)\Psi(x - x_0, y) ds \right|^2 \text{ and}$$

$$\eta_{crosstalk} = \left| \int_{lens\,area} \Psi(x, y)\Psi(x + P - x_0, y) ds \right|^2$$

As an example, if the design criteria calls for 10 dB attenuation range while maintaining crosstalk below 40 dB and using a Gaussian beam approximation for the beam profile which efficiently fills the lens aperture, then the necessary pitch P is approximately 1.5 times the lens diameter D (or gap is one half the lens diameter).

Figure 5:
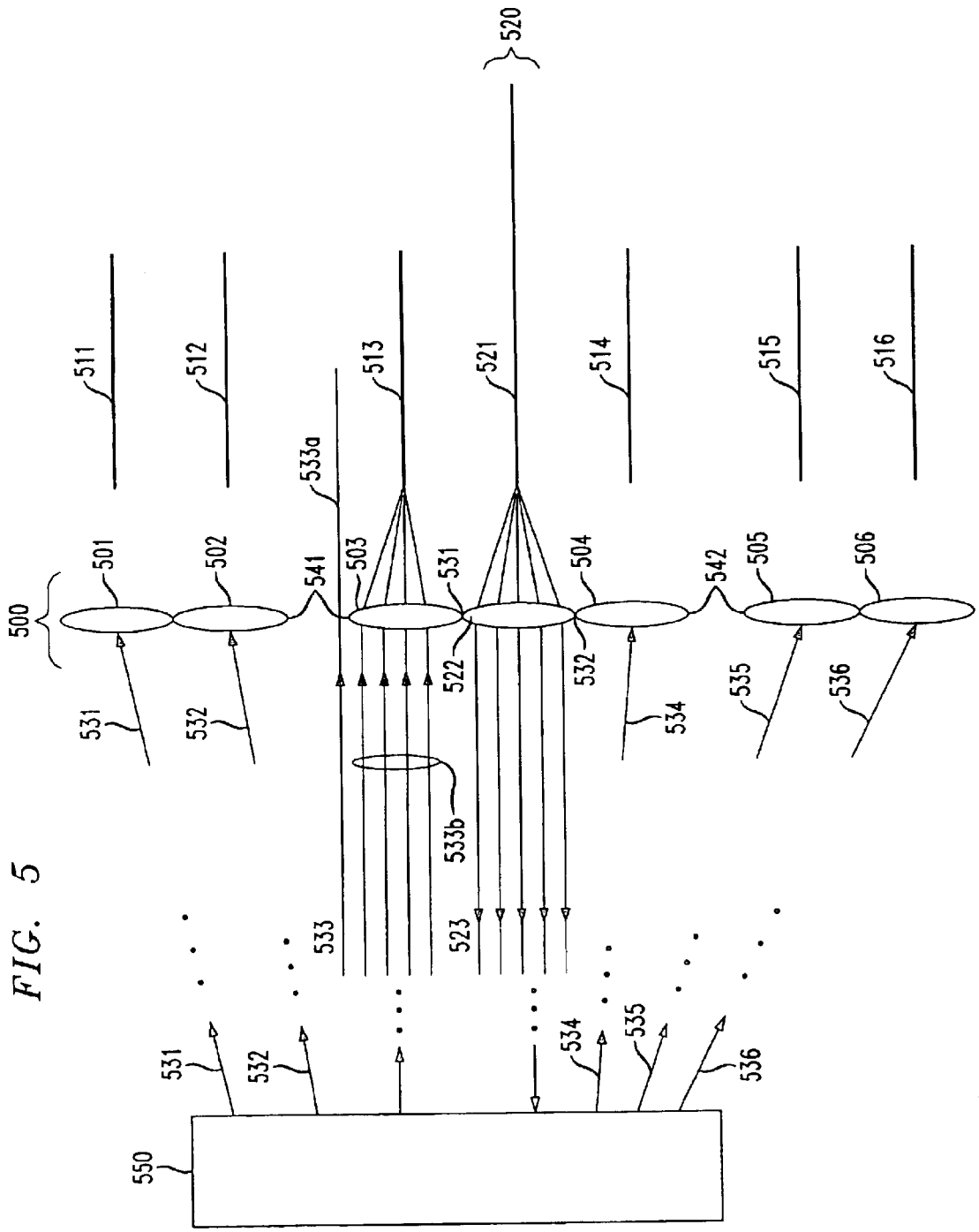
FIG. 5 is an illustration of an embodiment where the fiber and lens array include an input port within the output array.

In some applications, the optical beam-steering switching apparatus may contain a single input port, e.g., 321, and a multiple output ports, e.g., 310. With reference to FIG. 5, given the desire to minimize the overall size of the optical beam-steering switching apparatus, a reflective beam-steering switching apparatus, e.g., 550 (consisting of elements 120 of FIG. 1), may be used where the input and output microlens and fiber arrays, i.e., 520 and 510, respectively, are interspersed. In such an arrangement, no gaps, 531 and 532, are needed between the input port lens 522 and adjacent output lenses 503 and 504, respectively. Thus all the output lenses 500 are grouped in contiguous pairs, e.g., 501/502 and 505/506, with spaces or gaps inserted between these contiguous output lens pairs except the location where the input port lens 522 is placed between the output port lenses 503 and 504 forming a group of three contiguous lenses. Note that each output lens position still has an adjacent gap into which direction a beam can be shifted to attenuate that beam without producing excessive crosstalk to adjacent output lenses. Thus as shown, the attenuation of input beam 523 which is switched by reflective beam-steering apparatus 550 to become beam 533 has a portion of its optical energy 533*a* directed into gap 541. The attenuated remainder 533*b* of beam 530 is directed to lens 503 and output port of fiber 513. In a similar fashion, beam-steering apparatus 550 can reflect the input beam to any one of the output lenses 501–506, and be intentionally misaligned towards gap (e.g. 541 and 542) to allow for beam attenuation setting without producing crosstalk to adjacent lenses.

Figure 6:
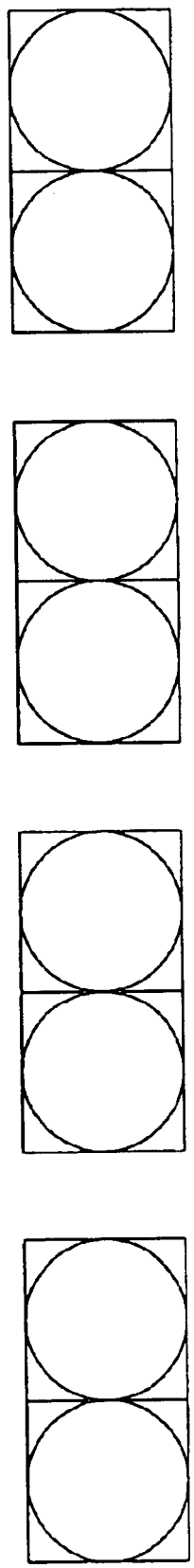
FIG. 6 illustrates the gap pattern for one dimensional lens array for the embodiments shown in FIGS. 3 and 5.
Figure 6:
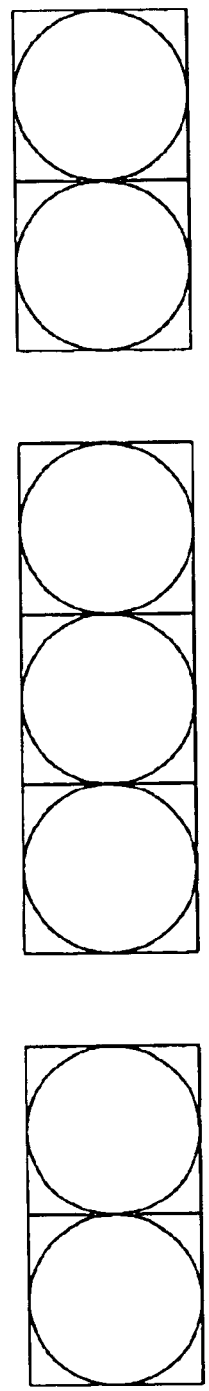

FIG. 6 illustrates the one-dimensional output lens layout 600 (supported by a MEMS device with one axis tilts) for the arrangement of FIG. 3 and the one-dimensional output lens layout 610 is shown for the arrangement of FIG. 5.

Figure 7:
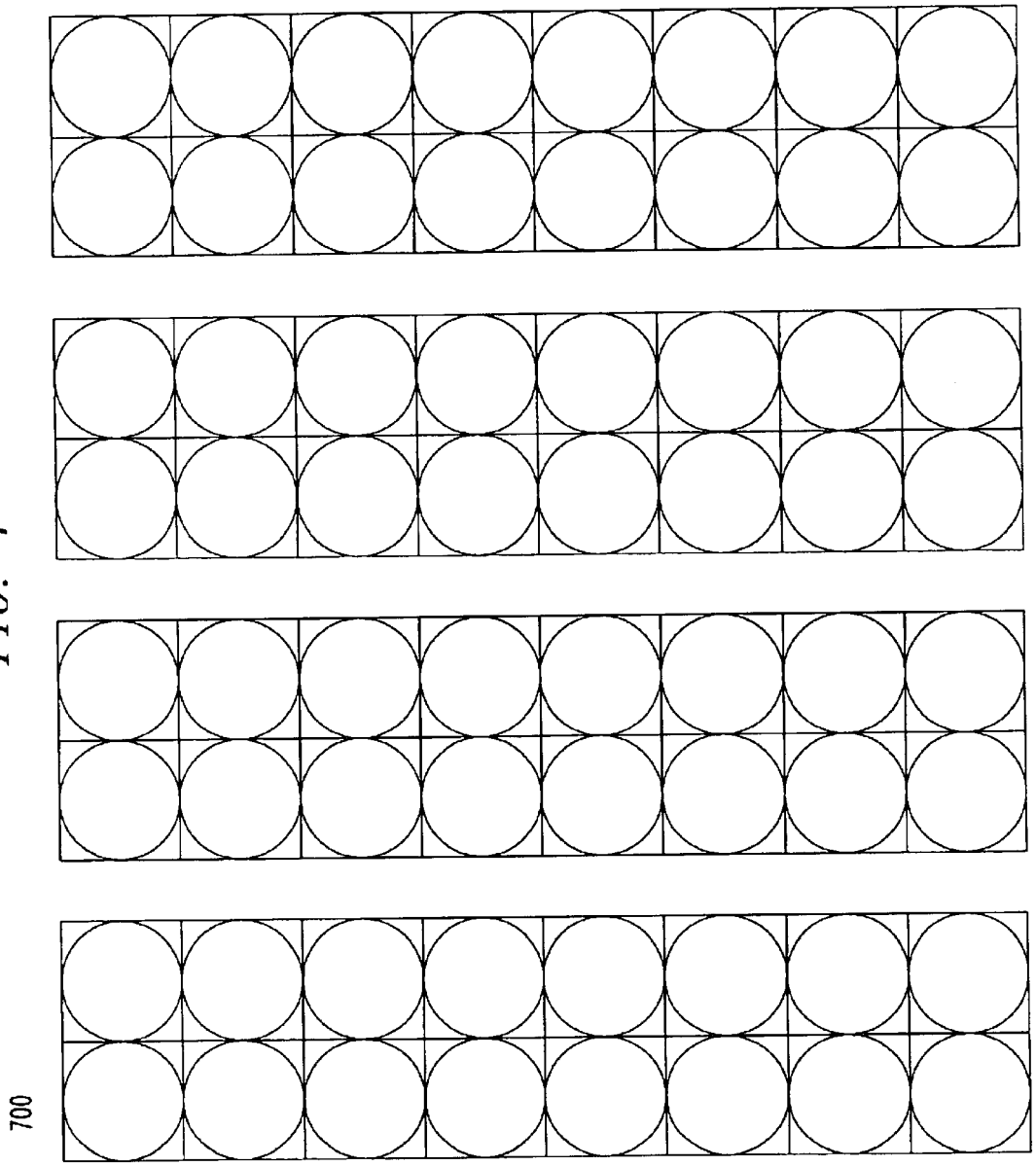
FIG. 7 is an illustration of the required gap pattern for a two dimensional lens array used with the embodiment of FIG. 3.

As shown in FIG. 7, when the arrangement of FIG. 3 includes an output lens array 700 that is a two-dimensional array (supported by a MEMS device with two axis tilts), the most efficient lens fill pattern is in columns that are again grouped in contiguous pairs and spaces inserted between them. As in previous cases, each output lens position has a direction to which the beam can be shifted to generate loss. A corresponding two-dimensional array for the arrangement of FIG. 5, while not shown, would start with 610 of FIG. 6 and the respective columns extended in the same manner as the two-dimensional array 700.

An important aspect of the present invention is that the irregular fiber/lens placement (shown in FIGS. 6 and 7) is arranged so that they can occupy the least area while still providing the functionality of beam attenuation and minimizing crosstalk. The least area feature is important, as it means that beam steering unit needs less beam deflection range and the system optics and total size is reduced.

Figure 8:
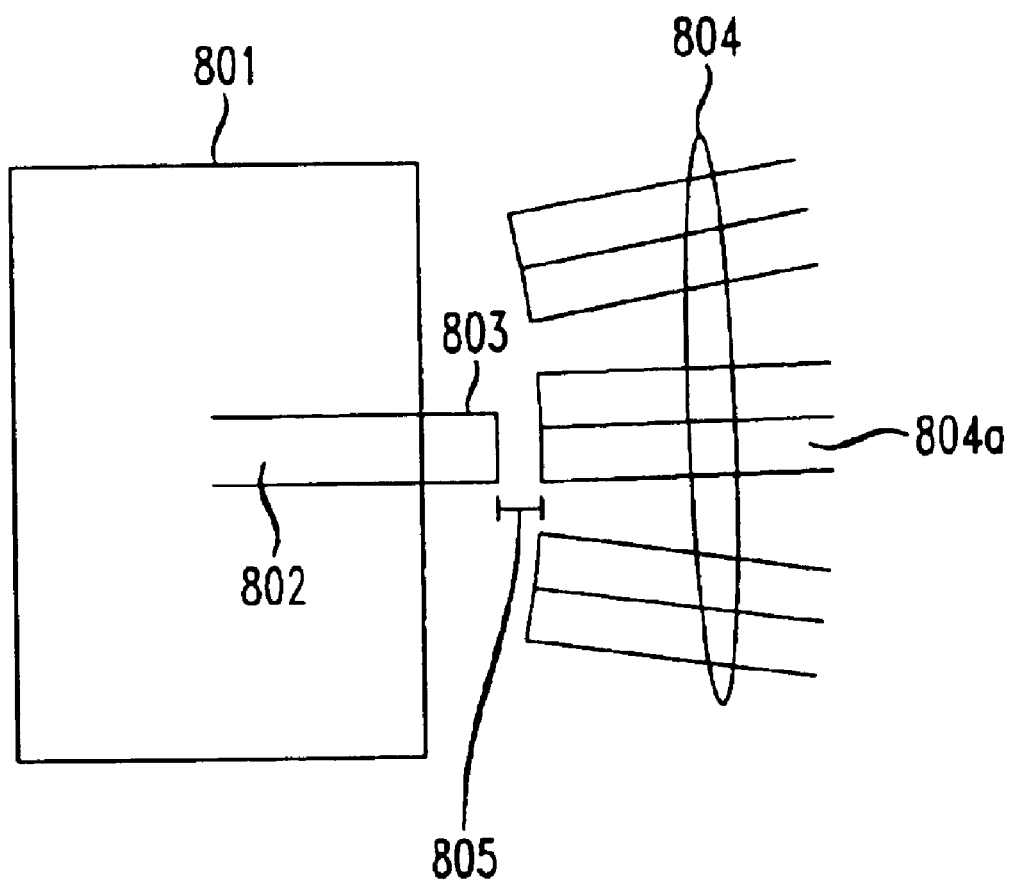
FIG. 8 shows an embodiment of the present invention that uses a beam steerer that controls the movement of an input waveguide.

As shown in FIG. 8, in accordance with another aspect of my invention, the irregular output fiber placement may also be used with a beam steering unit 801, based on moving input waveguide 802. In this application, an optical MEMS controlled waveguide 802 can be physically moved so that its free end 803 will come to close proximity of a target output waveguide 804*a*, so as to optimize beam coupling thereto. When the number of output fibers exceed two, my technique (FIGS. 6 and 7) may be used to define the locations of the output waveguides 804 to support the attenuation setting feature. In this application the free-space region 805 is the small gap between the tip 803 of the input waveguide 802 and that of the target output waveguide(s) 804. Since the gap 805 is very small (typically within the Rayleigh range in free space of the guided mode) no additional lenses (e.g., 102, 102*b*, 105*b* and 109 in FIG. 1) are required. The above described calculation technique for determining the irregular pitch is the same, using the guided mode of the waveguide.

Various modifications of this invention will occur to those skilled in the art. Nevertheless all deviations from the specific teachings of this specification that basically rely upon the principles and their equivalents through which the art has been advanced are properly considered within the scope of the invention as described and claimed.

I claim:

1. Apparatus for controlling the optical coupling of an input optical beam to one of a plurality of output optical facilities, comprising a plurality of lenses linearly arranged in separate groups, each group including a contiguous pair of lenses, each lens aligned to couple a received optical beam to one of the plurality of output optical facilities, a plurality of output optical facilities, each optical facility aligned co-axially with a corresponding one of the plurality of lenses, and wherein contiguous pairs of the plurality of lenses are arranged to have a predetermined space between such contiguous pairs, so that when the direction of a received beam is misaligned to a first lens of a contiguous pair, only a first portion of the received beam gets coupled to the corresponding output facility of that first lens to become an output beam and a second portion of the received beam propagates into the predetermined space so as not to be coupled to any of the plurality of output optical facilities.

2. The optical coupling control apparatus of claim 1 being part of an optical beam-steering switching apparatus that also includes an optical beam-steerer for receiving an input optical beam and for changing the direction of the received beam relative to one of the plurality of lenses so as to change the first portion of the received beam propagated to the corresponding output facility.

3. Apparatus for controlling the optical coupling of a received optical beam from one of a plurality of input optical facilities to an output facility, comprising a plurality of lenses arrayed in a linear array, each lens aligned to couple a received input optical beam from one of the plurality of input optical facilities, a plurality of input optical facilities, each optical facility aligned co-axially with a corresponding one of the plurality of lenses, and wherein contiguous pairs of the plurality of lenses are arranged to have a predetermined space between such contiguous pairs, so that when the output facility is misaligned to a lens of a contiguous pair that receives the input optical beam, only a first portion of the received input beam gets coupled to the output facility to become an output beam and a second portion of the received input beam is not coupled to said output facility.

4. The optical coupling control apparatus of claim 2 wherein the optical beam-steerer is a Micro Electro Mechanical Systems (MEMS) apparatus.

5. The optical coupling control apparatus of claim 1 wherein wherein the plurality of lenses are arranged in a one-dimensional array.

6. The optical coupling control apparatus of claim 1 wherein wherein the plurality of lenses are arranged in a two-dimensional array.

7. The optical coupling control apparatus of claim 1 wherein the diameter D of each lens of the plurality of lenses is the same and the separation pitch P being the separation between two microlenses located in adjacent contiguous pairs is chosen to create a gap, P-D, that provides a predetermined attenuation range to a destination output facility.

8. Apparatus for controlling the optical coupling of an input optical beam to one of a plurality of output optical facilities, comprising an input lens for receiving an input optical beam, a plurality of output lenses, each lens aligned to couple a received optical beam to one of the plurality of output optical facilities, each of the received optical beams being produced from the input beam, a plurality of output optical facilities, each optical facility aligned co-axially with a corresponding one of the plurality of lenses, and wherein the plurality of lenses are arranged in a one-dimensional array, the input lens located between and contiguous to two output lenses to form a three lens group, the remaining lenses of the plurality of lenses being arranged in contiguous pairs, the three lens group and the contiguous pair of the one-dimensional array being arranged to have a predetermined space between any contiguous pair and another contiguous pair or said three lens group, so that when a received beam is misaligned to a destination lens of a contiguous pair, only a first portion of the received beam gets coupled to the corresponding output facility of that destination lens and a second portion of the received beam propagates into the predetermined space so as not to be coupled to any lens of the plurality of output optical facilities.

9. The optical coupling control apparatus of claim 8 being part of an optical beam-steering switching apparatus that also includes an optical beam-steerer for receiving the input optical beam and for changing the direction of the received beam relative to one of the plurality of lenses so as to change the first portion of the received beam propagated to the corresponding output facility.

10. Apparatus for controlling the optical coupling of an input optical beam from an input waveguide to one of a plurality of output optical waveguides, comprising a plurality of output optical waveguides, pairs of the output optical waveguides being contiguous, each contiguous pair of output optical waveguides separated by a predetermine gap from the input waveguide to enable it to receive the input optical beam without the use of a lens and wherein contiguous pairs of the plurality of output optical waveguides are arranged to have a predetermined space between such contiguous pairs, so that when the direction of the received beam is misaligned to a destination optical waveguide of a contiguous pair, only a first portion of the received beam gets coupled to the corresponding output optical waveguide and a second portion of the received beam propagates into the predetermined space so as not to be coupled to any of the plurality of output optical optical waveguides.

* * * * *